United States Patent
Yajima

(10) Patent No.: US 7,480,625 B2
(45) Date of Patent: Jan. 20, 2009

(54) SALES DATA PROCESSING DEVICE AND PROGRAM

(75) Inventor: Takehiko Yajima, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 96 days.

(21) Appl. No.: 11/199,404

(22) Filed: Aug. 8, 2005

(65) Prior Publication Data

US 2005/0289077 A1 Dec. 29, 2005

Related U.S. Application Data

(63) Continuation of application No. PCT/JP2004/002790, filed on Mar. 5, 2004.

(30) Foreign Application Priority Data

Mar. 7, 2003 (JP) .............................. 2003-061459

(51) Int. Cl.
*G06Q 20/00* (2006.01)
(52) U.S. Cl. .................... 705/16; 705/400; 235/375; 700/90
(58) Field of Classification Search ............... 705/16
See application file for complete search history.

(56) References Cited

U.S. PATENT DOCUMENTS

| | | | | |
|---|---|---|---|---|
| 2,254,789 A | * | 9/1941 | Benton et al. | 74/10.33 |
| 4,238,832 A | * | 12/1980 | Tsuzuki et al. | 708/111 |
| 6,608,474 B2 | * | 8/2003 | Yamauchi | 324/76.48 |
| 7,003,495 B1 | * | 2/2006 | Burger et al. | 705/50 |
| 2005/0105399 A1 | * | 5/2005 | Strumpf et al. | 368/47 |

FOREIGN PATENT DOCUMENTS

| | | |
|---|---|---|
| JP | 61-78387 | 5/1986 |
| JP | 4-74319 | 6/1992 |
| JP | 5-12570 A | 1/1993 |
| JP | 06-242862 A | 9/1994 |
| JP | 7-152973 A | 6/1995 |
| JP | 2000-99833 A | 4/2000 |

OTHER PUBLICATIONS

Translation of JP 7-152973.*

* cited by examiner

*Primary Examiner*—F. Zeender
*Assistant Examiner*—Luna Champagne
(74) *Attorney, Agent, or Firm*—Frishauf, Holtz, Goodman & Chick, P.C.

(57) ABSTRACT

A sales data processing device comprises electromagnetic wave clock means for receiving a time signal containing date and time information transmitted from a transmission station, and clocking a date and time by correcting the date and time based on the received time signal, clock means for clocking the date and time based on the date and time obtained from the electromagnetic wave clock means, processing determination means for determining whether data processing is being executed or not, correction means for correcting the date and time of the clock means based on the date and time obtained from the electromagnetic wave clock means in a period of no execution of data processing, and data processing means for processing input sales data by referring to the date and time clocked by the clock means in a period of execution of data processing.

3 Claims, 10 Drawing Sheets

SALES DATA PROCESSING DEVICE AND PROGRAM

CROSS REFERENCE TO RELATED APPLICATIONS

This is a Continuation Application of PCT Application No. PCT/JP2004/002790, filed Mar. 5, 2004, which was published under PCT Article 21(2) in Japanese.

This application is based upon and claims the benefit of priority from prior Japanese Patent Application No. 2003-061459, filed Mar. 7, 2003, the entire contents of which are incorporated herein by reference.

BACKGROUND OF THE INVENTION

1. Field of the Invention

The present invention relates to a sales data processing device and a program for executing sales data processing based on a date and time.

2. Description of the Related Art

An electronic cash register (ECR) installed on each counter in a store such as a department store, a supermarket or a convenience store registers input sales data, and outputs sale proceeds, a sales volume, and the like.

Such an ECR comprises a clock circuit therein to clock a date and time. By this clock circuit, a date and time of registering the sales data, or a date and time of recording on a receipt are clocked.

Conventionally, at the ECR, a date and time have initially been set manually by an operator at the time of shipping the ECR from a factory or at the time of delivering the ECR.

To prevent execution of data processing while this initial setting has not been made, there has been developed an ECR which sets a flag to determine whether a date has been set or not, and processes sales data only when the date is determined to have been set.

Technology contents of such an ECR which processes sales data only when a date is determined to have been set is disclosed in, for example, Jpn. Pat. Appln. KOKAI Publication No. 5-012570.

However, in the conventional ECR, the date and time have been set manually by the operator, and the setting work has been very complicated. Additionally, when a deviation occurs in time to be clocked by the clock circuit after installation of the ECR at the store, a date and time must be set again to correct the time, imposing a great burden on a user.

Further, in the case of correcting the time at the ECR, there is a possibility that a date and time printed on a receipt or a journal will be set back or forward by the time correction.

For example, registered contents are printed on a journal at the time of "14:00", then the time is corrected to be "13:59", and next registered contents are printed on the journal immediately thereafter. In such a case, the time of the journal is set back, consequently making recording of the registered contents indefinite.

Thus, time correction has had to be executed immediately before day's registration processing is finished and an operation of the ECR is stopped, resulting in inconvenient time correction.

BRIEF SUMMARY OF THE INVENTION

According to one embodiment of the present invention, there is provided a sales data processing device comprises electromagnetic wave clock means for receiving a time signal containing date and time information transmitted from a transmission station, and clocking a date and time by correcting the date and time based on the received time signal, clock means for clocking the date and time based on the date and time obtained from the electromagnetic wave clock means, processing determination means for determining whether data processing is being executed or not, correction means for correcting the date and time of the clock means based on the date and time obtained from the electromagnetic wave clock means in a period of no execution of data processing, and data processing means for processing input sales data by referring to the date and time clocked by the clock means in a period of execution of data processing.

DETAILED DESCRIPTION OF THE INVENTION

Hereinafter, an embodiment of the present invention will be described in detail with reference to the accompanying drawings.

The embodiment will be described by way of example in which the present invention is applied to an ECR, the ECR comprises an electromagnetic wave clock unit for correcting time based on a time signal received by radio and clocking an accurate date and time, and time correction is executed by, among a plurality of time correction methods, a time correction method compliant with an operation situation of the ECR.

First, a configuration example of the ECR to which the present invention is applied will be described.

Figure 1:
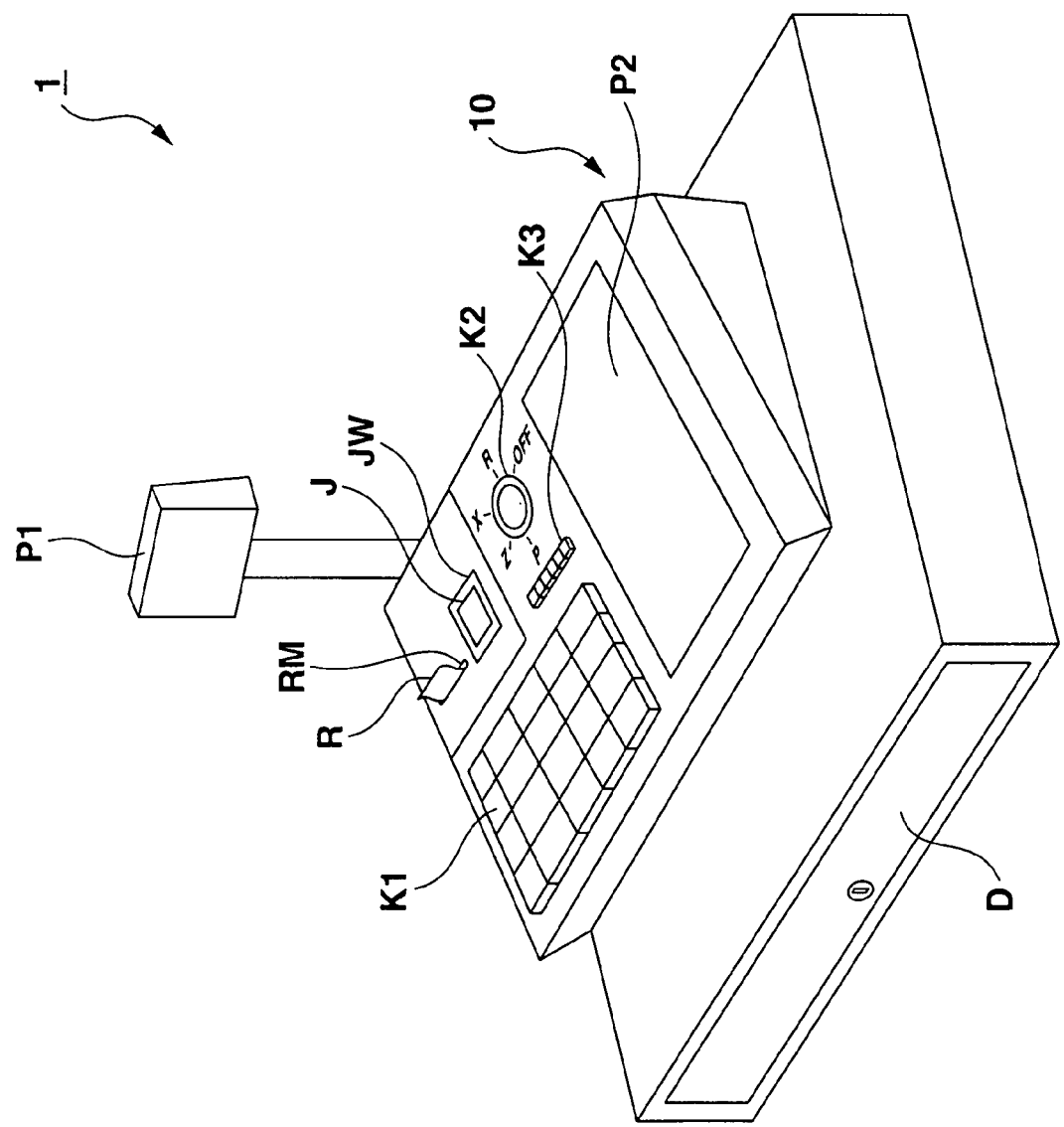
FIG. 1 is an appearance diagram of an electronic cash register (ECR) according to an embodiment of the present invention.

FIG. 1 shows an appearance example of an ECR 1 according to the embodiment.

As shown in FIG. 1, the ECR comprises a rotary indicator P1, a main body section 10, and a door D.

The rotary indictor P1 indicates input sales data or its data processing result to a customer, and a display for displaying the processing result of the sales data is constructed to rotate around a support.

On the main body section 10, there are disposed a paper ejecting port RM, a journal window JW, a ten key/function key K1, a mode key K2, a person-in-charge key K3, and a touch panel P2.

A receipt R is ejected out of the paper ejecting port RM. The journal window JW is a window for checking a journal J. The ten key/function key K1 is for inputting sales data or the like. The mode key K2 is for designating an operation mode of the ECR 1.

The person-in-charge key K3 is for specifying a person in charge who operates the ECR 1. The touch panel P2 is for displaying various pieces of information such as input sales data and its data processing result to an operator.

The mode key K2 comprises a designation key for designating a desired mode among a registration mode R for registering sales data such as sale proceeds or the number of times, an inspection mode X for inspecting the registered sales data, a settlement mode Z for reading and resetting the registered sales data, a setting mode P for setting various environments of ECR 1, and an OFF mode for finishing each operation mode to stop an operation.

The door D is a drawer for receiving cash, and closed only when an opening instruction comes from a user.

Next, referring to FIG. 2, a functional configuration of the ECR 1 will be described.

Figure 2:
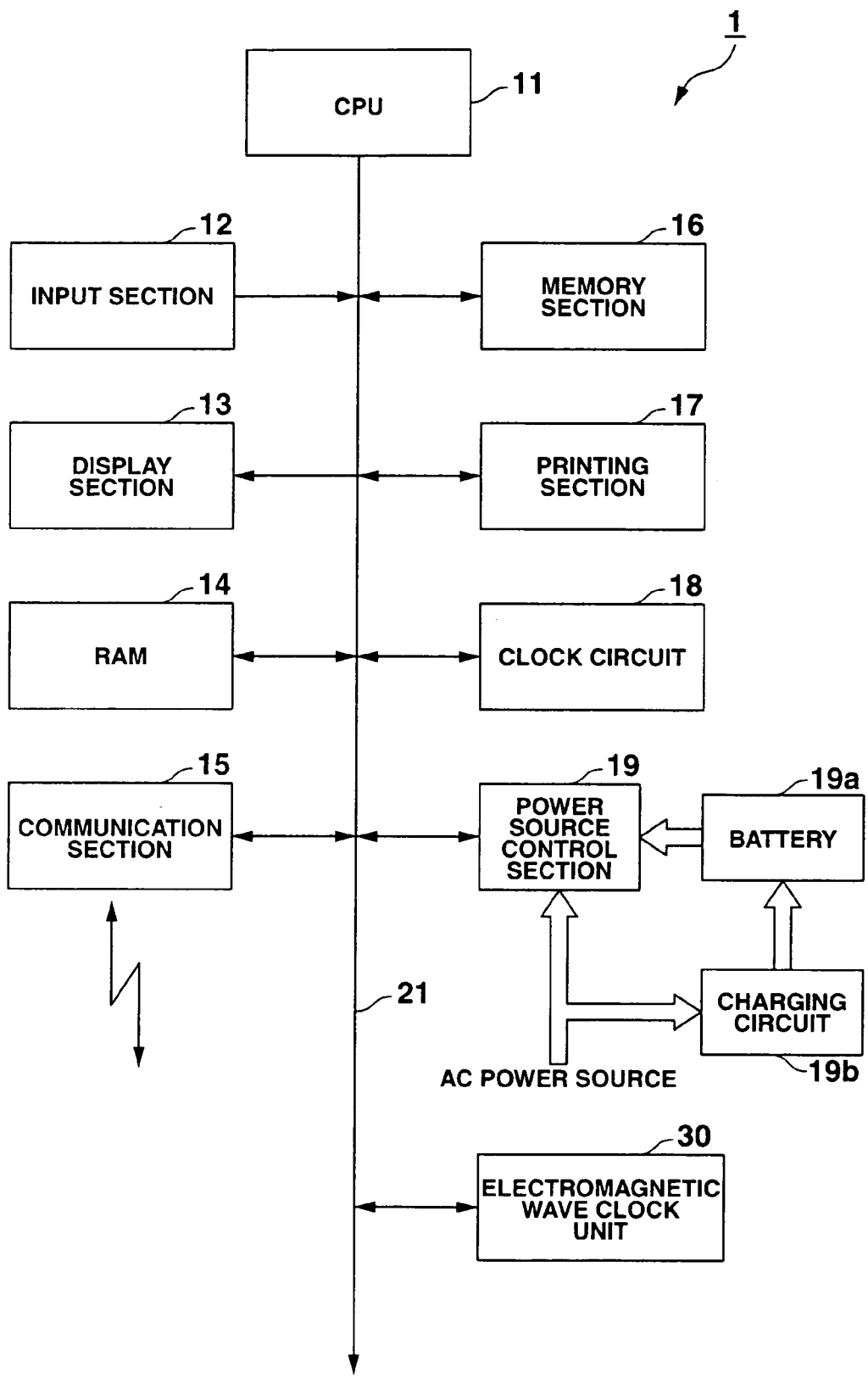
FIG. 2 is a diagram showing a functional configuration of the ECR shown in FIG. 1.

As shown in FIG. 2, the ECR 1 comprises a central processing unit (CPU) 11, an input section 12, a display section 13, a random access memory (RAM) 14, a communication section 15, a memory section 16, a printing section 17, a clock circuit 18, a power source control section 19, and an electromagnetic wave clock unit 30, and these sections are interconnected through a bus 21.

The CPU 11 develops, in addition to s system program stored in the memory section 16, a selection processing program of a time correction method of the present invention (see FIG. 8), a standby time correction processing program (see FIG. 9), a time correction processing program compliant with sensitivity (see FIG. 10), a time correction processing program executed at regular time intervals (see FIG. 11), a sales data processing program (see FIG. 12), and the like in the RAM 14, and controls the processing operations overall in cooperation with the programs.

The CPU 11 determines an energized state of the ECR 1 based on a power-down signal (signal indicating a black-out state of the ECR 1 due to disconnection with an AC power source which is a main power source) input from the power source control section 19 in selection processing of the later-described time correction method.

The CPU 11 determines an operation mode of the ECR 1 set by the mode key K2, thereby determining an operation situation of the ECR 1, and selects a time correction method in accordance with the determined operation situation.

The CPU 11 has a timer function, and executes clocking (counting) for a predetermined time. Specifically, the CPU 11 stores a counter value counted by a secondary power source during energization when the ECR 1 is cut off from the main power source as a first counter value in the RAM 14. Additionally, the CPU 11 stores a counter value counted by the main power source during the energization as a second counter value in the RAM 14.

The input section 12 includes the ten key/function key K1, the mode key K2, the person-in-charge key K3, the touch panel P2 and the like of the main body section 10 shown in FIG. 1, and outputs a pressing signal corresponding to a key pressed by the user to the CPU 11.

The display section 13 includes the touch panel P2, the rotary indicator P1 and the like of the main body section 10 shown in FIG. 1. The display section 13 displays various pieces of display information such as sales data input via the input section 12, reception sensitivity of an electromagnetic wave at the electromagnetic wave clock unit 30, a processing result of the CPU 11, and the like.

Figure 3:
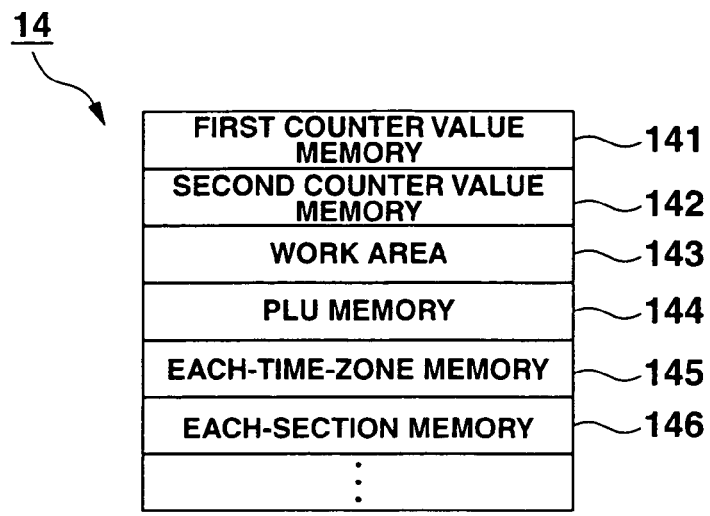
FIG. 3 is a diagram showing a memory configuration example of a RAM shown in FIG. 2.

As shown in FIG. 3, the RAM 14 comprises a first counter value memory 141 for storing the first counter value, and a second counter value memory 142 for storing the second counter value.

The RAM 14 comprises a work area 143 for temporarily storing various programs executed by the CPU 11 and data regarding these programs.

The first counter value stored in the first counter value memory 141 and the second counter value stored in the second counter value memory 142 are incremented by 1 to be updated at regular time intervals under control of the CPU 11.

Further, the RAM 14 comprises various memory areas regarding registration processing of sales data, such as a price look-up (PLU) memory 144 for storing information of commercial goods, an each-time-zone memory 145 for storing total sales data for each designated time zone, and an each-section memory 146 for storing total sales data for each section of commercial goods.

The communication section 15 comprises a network interface card, a modem, and the like, and transfers information with external devices through a communication network.

The memory section 16 comprises a storage medium on which programs or data are stored beforehand. This storage medium comprises a magnetic or optical recording medium, or a semiconductor memory, and is disposed by being fixed to the memory section 16, or detachably fixed.

The storage medium stores, in addition to the system program, various programs such as the selection processing program of the time correction method, the standby time correction processing program, the time correction processing program compliant with sensitivity, the time correction processing program executed at the regular time intervals, and the sales data processing program, and data processed by the programs.

A configuration may be employed in which the programs and the data stored on the storage medium may be received from other devices connected through the communication network to be stored. Further, a configuration may be employed in which a memory device equipped with the storage medium is disposed on the other device side connected through the communication network, and the programs and the data stored on the storage medium are obtained through the communication network.

The printing section 17 comprises, for example, a print head section in which thermal elements of segment units are arranged in a line shape, and a conveying section for sending a set roll-shaped receipt form to the print head section.

Based on sales data and date and time data input for each line at a predetermined time interval from the CPU 11, the printing section 17 executes receipt form feeding and printing on the receipt form, and ejects the printed receipt through the paper ejecting port RM.

The printing section 17 prints contents identical to contents printed on the receipt on a journal form simultaneously with the printing on the receipt.

The clock circuit 18 clocks a current date and time of seconds, minutes, time, a month and a year, and outputs the date and time data.

The power source control section 19 supplies power fed from the alternating current (AC) power source which is the main power source to each section of the ECR 1. The power fed from the AC power source is also supplied by a charging circuit 19b to a battery 19a which is the secondary power source.

When a connection with the AC power source is cut off, the power source control section 19 receives power from the battery 19a, and supplies the power to each section of the ECR 1. During the power feeding from the battery 19a, the power source control section 19 outputs a power-down signal indicating a black-out state of the main power source to the CPU 11.

The electromagnetic wave clock unit 30 receives a time signal containing accurate date and time information through an electromagnetic wave, and clocks accurate date and time based on the received time signal.

Figure 4:
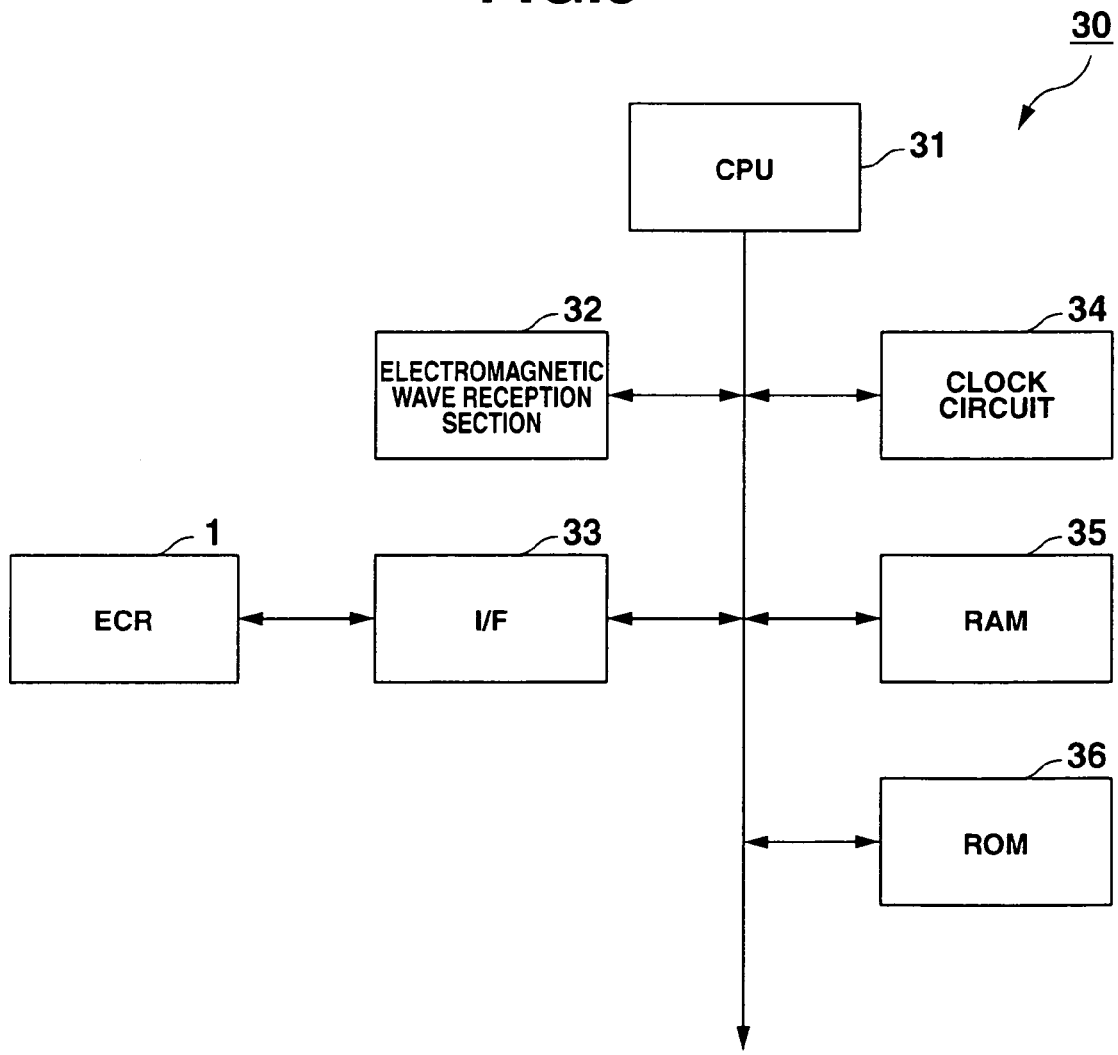
FIG. 4 is a diagram showing a functional configuration of an electromagnetic wave clock unit shown in FIG. 2.

FIG. 4 shows a functional configuration of the electromagnetic wave clock unit 30.

As shown in FIG. 4, the electromagnetic wave clock unit 30 comprises a CPU 31, an electromagnetic wave reception section 32, an interface (I/F) 33, a clock circuit 34, a RAM 35, a read only memory (ROM) 36.

The CPU 31 develops in the RAM 35 a clocking processing program (see FIG. 7) stored in the ROM 36, and controls a processing operation overall in cooperation with the program.

The CPU 31 has a timer function, and a counted counter value is stored as a third counter value in the RAM 35.

The CPU 31 always detects an electromagnetic wave received state at the electromagnetic wave reception section 32, and evaluates a level of reception sensitivity based on the received state. Information of this evaluated reception sensitivity is stored in the RAM 35.

Figure 5A:
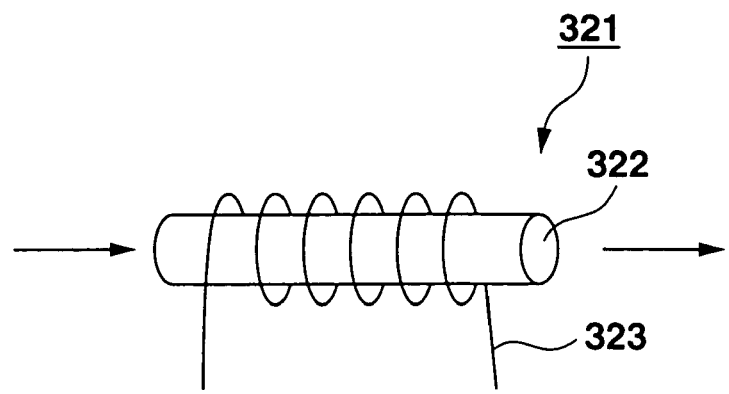
FIG. 5A is a diagram showing an antenna of an electromagnetic wave reception section shown in FIG. 4.

As shown in FIG. 5A, the electromagnetic wave reception section 32 comprises an antenna 321 which has a conductor 323 wound around a rod-like magnetic body 322 in a coil shape. The electromagnetic wave reception section 32 receives, through the antenna 321, a time signal from a transmission station which transmits the time signal containing accurate date and time information (time code information) as a standard electromagnetic wave.

The antenna 321 receives an electromagnetic wave in an arrow direction shown in FIG. 5A. Accordingly, reception sensitivity of the antenna 321 is changed in accordance with its installed state.

Figure 5B:
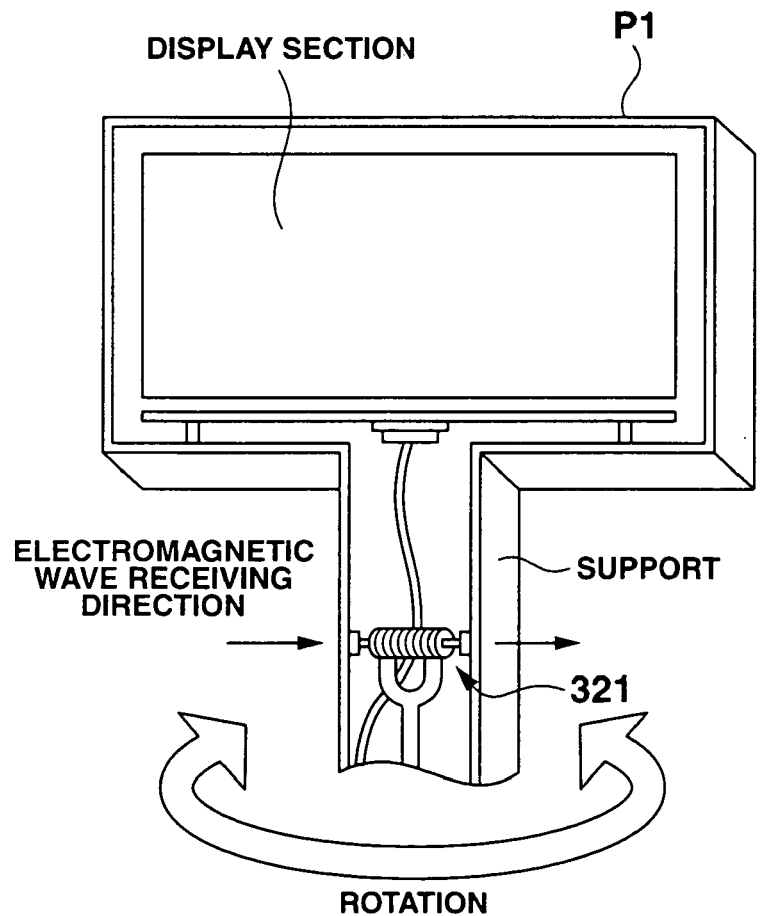
FIG. 5B is a diagram showing an example in which the antenna shown in FIG. 5A is installed in a rotary indicator.

FIG. 5B shows an installation example of the antenna 321.

As shown in FIG. 5B, the antenna 321 is installed in the support of the rotary indicator P1, and both ends of the magnetic body 322 are mounted to a wall surface inside the support. In other words, an electromagnetic wave reception position of the antenna 321 can be changed by rotation of the rotary indicator P1.

The interface 33 is an interface for connection with the ECR 1.

The clock circuit 34 clocks a current date and time of seconds, minutes, time, a month, and a year, and outputs this date and time data.

Figure 6:
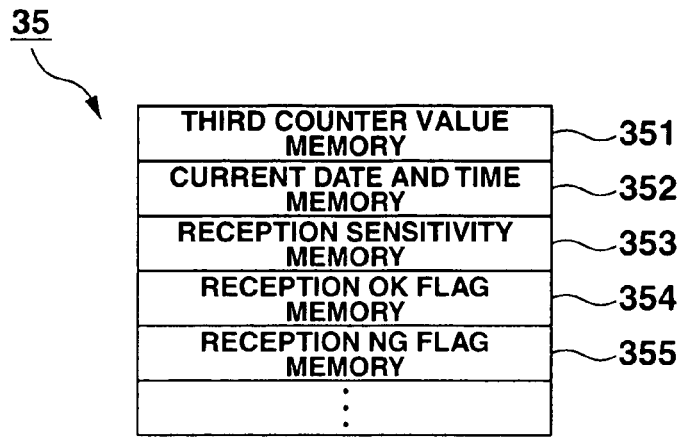
FIG. 6 is a diagram showing a memory configuration example of a RAM shown in FIG. 4.

As shown in FIG. 6, the RAM 35 comprises memory clocks of a third counter value memory 351 for storing a third counter value, a current date and time memory 352 for storing the current date and time data clocked by the clock circuit 34, and a reception sensitivity memory 353 for storing information regarding the reception sensitivity of the electromagnetic wave clock unit 30.

The third counter value stored in the third counter memory 351 is incremented by 1 to be updated at regular time intervals under control of the CPU 31.

The RAM 35 further comprises memory areas of a reception OK flag memory 354, and a reception NG flag memory 355.

The reception OK flag memory 354 stores reception OK flag data indicating successful reception of a time signal. In other words, when reception succeeds, a reception OK flag is set to ON. When reception fails, the reception OK flag is set to OFF.

The reception NG flag memory 355 stores reception NG flag data indicating failed reception of the time signal. In other words, when reception fails, a reception NG flag is set to ON. When reception succeeds, the reception NG flag is set to OFF.

The ROM 36 comprises a semiconductor memory or the like, and stores a clocking processing program.

Next, an operation of the embodiment will be described.

The embodiment will be described by way of example in which a time correction method at the clock circuit 18 is selected in accordance with an operation situation of the ECR 1, a time signal is received by the electromagnetic wave clock unit 30 to clock an accurate date and time in accordance with the selected time correction method, and time at the clock circuit 18 of the ECR 1 is corrected based on the accurate date and time clocked by the electromagnetic wave clock unit 30, i.e., example in which correction of the date and time of the electromagnetic wave clock unit 30 is executed based on the time signal transmitted through an electromagnetic wave, and correction of the date and time of the clock circuit 18 for clocking the date and time used for actual processing is further executed.

First, referring to FIG. 7, contents of clocking processing executed by the electromagnetic wave clocking unit 30 will be described. This clocking processing is for clocking an accurate date and time based on a received time signal, and outputting data of the date and time clocked in response to a request from the ECR 1 to the same.

Figure 7:
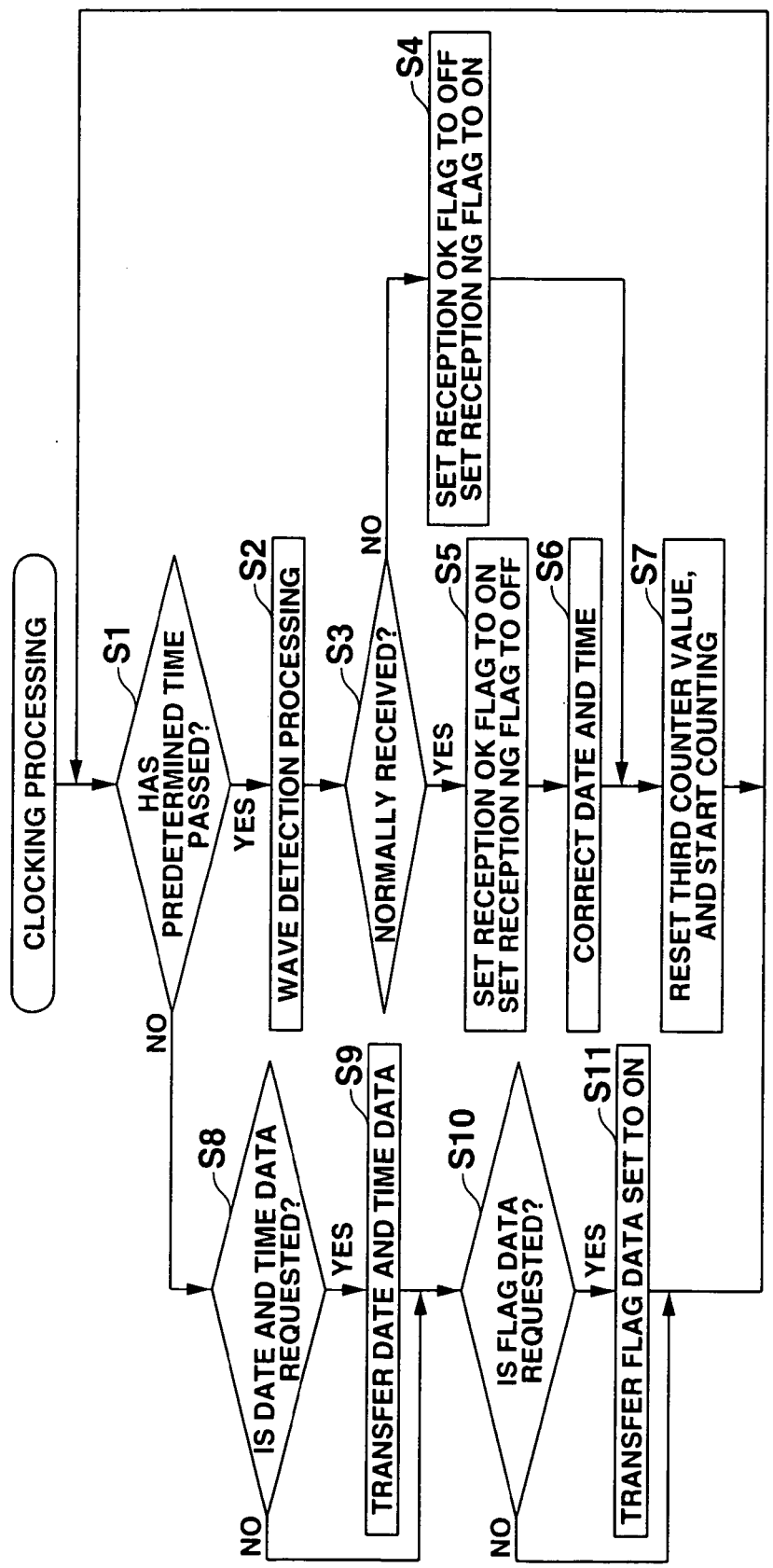
FIG. 7 is a flowchart explaining contents of clocking processing executed by the electromagnetic wave clock unit shown in FIG. 2.

In the clocking processing shown in FIG. 7, first in a step S1, the CPU 31 refers to the counter value stored in the third counter value memory 351 to determine whether the counter value has reached a fixed value or not, i.e., whether a certain period of time has passed or not after resetting of the counter value. Resetting conditions of the third counter value will be described later.

If the passage of a certain period of time is determined (step S1; Yes), the process proceeds to a step S2. If the passage of a certain period of time is not determined (step S1; No), the process proceeds to a step S8.

First, a case in which the passage of a certain period time is determined will be described.

In the step S2, wave detection processing is executed by the electromagnetic wave reception section 32 to detect an electromagnetic wave of a time signal. Next, in a step S3, the CPU 31 determines whether the time signal has correctly been received or not.

If electromagnetic wave reception sensitivity is low, and the time signal has not correctly been received (step S3; No), the flag is set to OFF in the reception OK flag memory 354 of the RAM 35, and the flag is set to ON in the reception NG flag memory 355 (step S4). After the setting of the flags in this manner, the process proceeds to a step S7.

On the other hand, if the time signal has correctly been received (step S3; Yes), the flag is set to ON in the reception OK flag memory 354 of the RAM 35, and the flag is set to OFF in the reception NG flag memory 355 (step S5).

Next, in a step S6, the CPU 31 corrects the date and time clocked by the clock circuit 34 based on the time signal received in the processing of the step S2, and stores data of the corrected date and time in the current date and time memory 352.

Next, in the step S7, the CPU 31 resets the counter value stored in the third counter value memory 351. Accordingly, the third counter value becomes 0, and is increased again until the aforementioned fixed value is reached. After a start of clocking, the process returns to the step S1.

Next, a case in which the passage of a certain period of time is not determined in the step S1 will be described.

In a step S8, the CPU 31 determines whether the current date and time data has been requested or not from the ECR 1.

Upon determination that the date and time data has been requested (step S8; Yes), the CPU 31 transfers the date and time data stored in the current date and time memory 352 to the ECR 1 via the interface 33 (step S9), and proceeds to processing of a step S10.

Upon determination that the date and time data has not been requested (step S8; No), the process proceeds to the step S10 without executing the processing of the step S9.

Next, in the step S10, the CPU 31 determines whether flag data has been requested or not from the ECR 1.

Upon determination that the flag data has been requested (step S10; Yes), the CPU 31 transfers the flag data set to ON of the reception OK flag data stored in the reception OK flag memory 354 and the reception NG flag data stored in the reception NG flag memory 355 to the ECR 1 via the interface 33 (step S11), and returns to the step S1.

On the other hand, upon determination that the flag data has not been requested (step S10; No), the CPU 31 returns to the step S1 without executing the processing of the step S11.

Next, referring to FIG. 8, contents of selection processing of the time correction method executed by the ECR 1 will be described. This selection processing of the time correction method is for determining an operation situation of the ECR 1 and selecting a time correction method at the clock circuit 18 in accordance with the determined operation situation.

Figure 8:
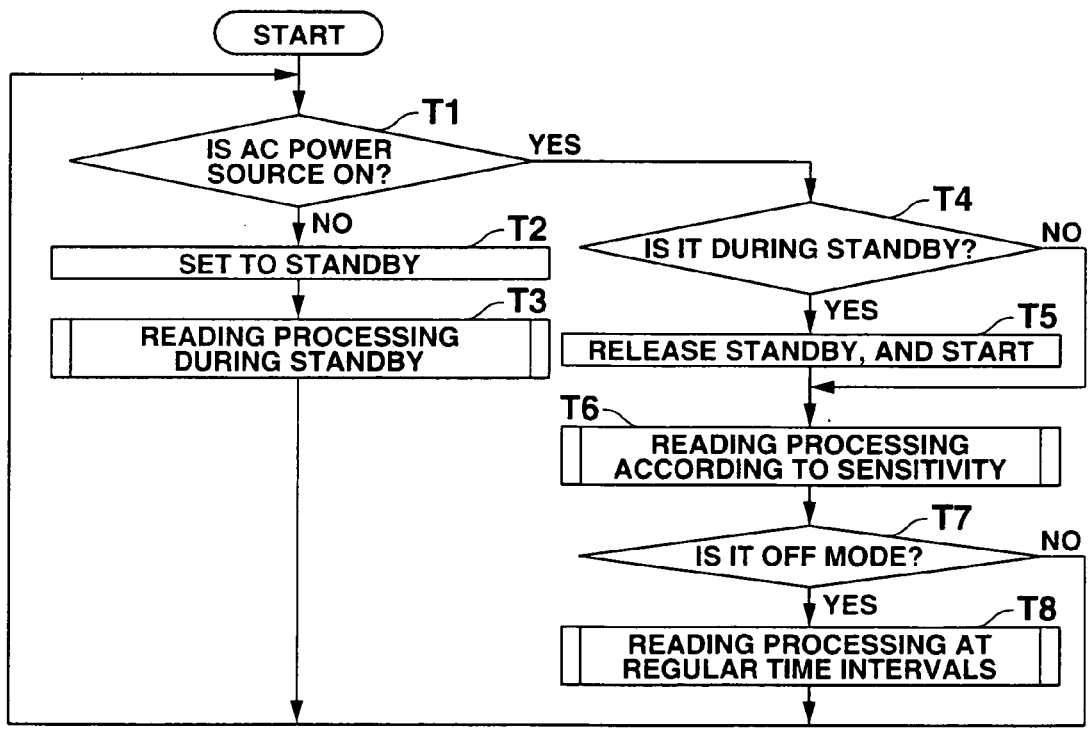
FIG. 8 is a flowchart explaining contents of selection processing of a time correction method executed by the ECR shown in FIG. 1.

In the selection processing of the time correction method shown in FIG. 8, first in a step T1, the CPU 11 determines whether a power-down signal has been output or not from the power source control section 19, thereby determining an ON state of the AC power source in which the ECR 1 is connected to the AC power source.

For example, if the ECR 1 is disconnected from the AC power source in a period in which the ECR 1 is stored in a storehouse, being transported from a factory, or installed in a store but not operated for a long time, the ECR 1 is set to a black-out state, thereby outputting a power-down signal from the power source control section 19.

In this case, the ECR 1 receives power from the battery 19a to be energized, and a power mode of the ECR 1 is switched from a black-out mode to a power saving mode.

If there is no power-down signal output from the power source control section 19, and the AC power source is in an ON state (step T1; Yes), the process proceeds to a step T4.

On the other hand, if there is a power-down signal output from the power source control section 19, and the AC power source is determined to be in an OFF state (step T1; No), the ECR 1 is set to a standby state to wait for its start in the power saving mode (step T2). After the setting of the standby state, the process proceeds to processing of a step T3, i.e., standby time correction processing.

Figure 9:
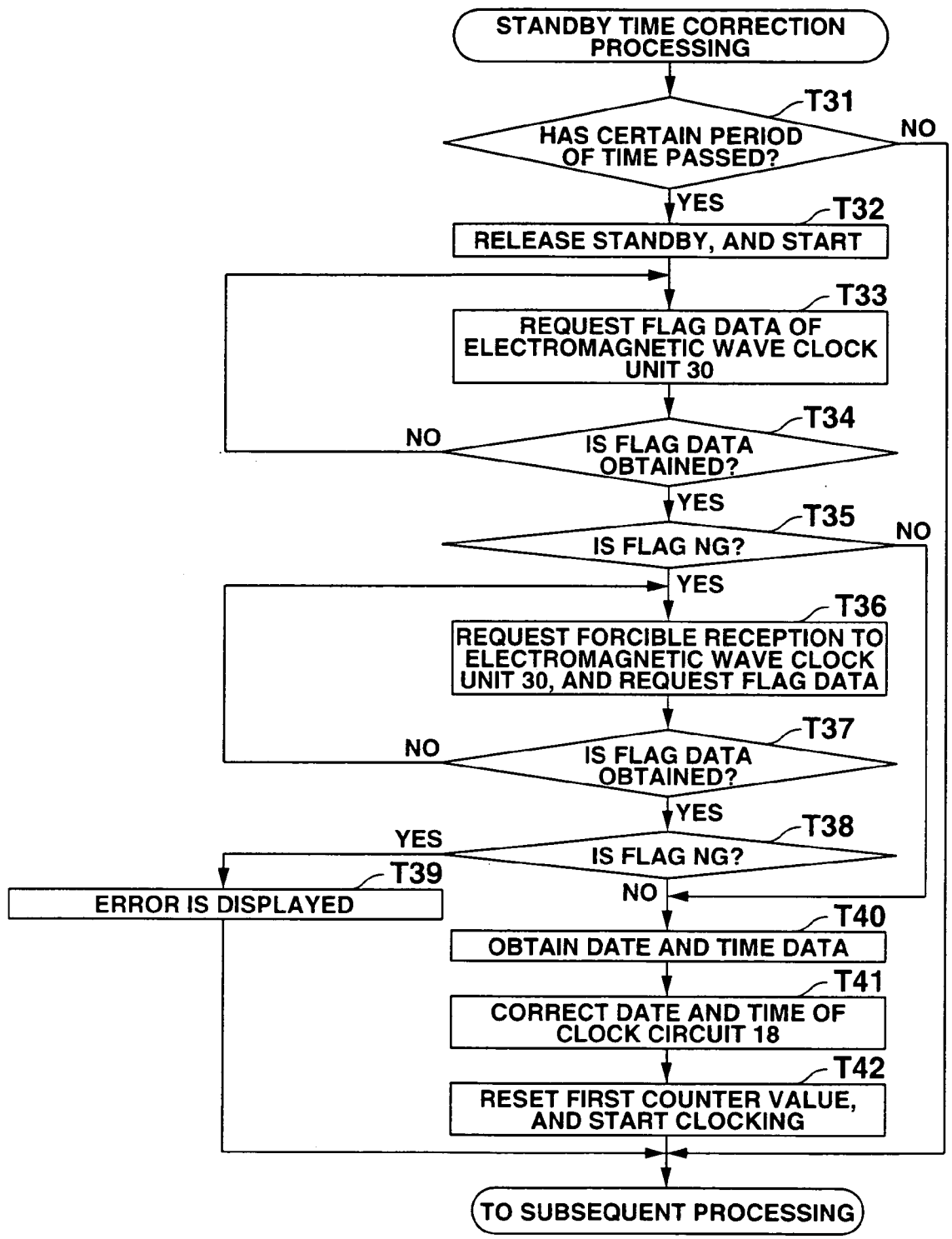
FIG. 9 is a flowchart explaining contents of standby time correction processing executed by the ECR shown in FIG. 1.

Referring to FIG. 9, contents of the standby time correction processing which is the processing of the step T3 will be described. This standby time correction processing is executed in a black-out situation in which the connection with the AC power source is cut off, i.e., the ECR 1 is not used. It is processing for correcting time by starting the ECR 1 through energization by the battery 19a at regular time intervals, and causing the electromagnetic wave clock unit 30 to forcibly receive a time signal.

In the standby time correction processing shown in FIG. 9, first in a step T31, the CPU 11 refers to the counter value stored in the first counter value memory 141 of the RAM 14 to determine whether the counter value has reached a fixed value or not, i.e., whether a certain period of time has passed or not after resetting of the first counter value. Resetting conditions of the first counter value will be described later.

If the passage of a certain period of time is not determined (step T31; No), the CPU 11 finishes this processing, and proceeds to subsequent processing, i.e., the step T1 of FIG. 8. On the other hand, if the passage of a certain period of time is determined (step T31; Yes), the CPU 11 temporarily releases the standby state of the ECR 1. Thus, the ECR 1 is started (step T32).

Next, in a step T33, the CPU 11 generates request information for requesting flag data set to ON in the reception OK flag memory 354 or the reception NG flag memory 355 of the electromagnetic wave clock unit 30, and outputs this request information to the electromagnetic wave clock unit 30.

After the flag data has been requested, in a step T34, the CPU 11 determines which of the reception OK flag data and the reception NG flag data has been obtained from the electromagnetic wave clock unit 30. Upon determination that neither of the flag data has been obtained (step T34; No), the CPU 11 returns to the processing of the step T33 to request flag data again.

On the other hand, if the reception OK flag data or the reception NG flag data has been obtained from the electromagnetic wave clock unit 30 (step T34; Yes), in a step T35, the CPU 11 determines whether the obtained flag data is reception NG flag data or not.

If the obtained flag data is the reception NG flag data (step T35; Yes), the process proceeds to a step T36. If the obtained flag data is the reception OK flag data (step T35; No), the process proceeds to a step T40.

In the step T36, the CPU 11 generates request information for requesting the electromagnetic wave clock unit to forcibly receive a time signal, and outputs this request information to the electromagnetic wave clock unit 30.

Next, in a step T37, the CPU 11 determines which of the reception OK flag data and the reception NG flag data has been obtained. If neither of the flag data has been obtained (step T37; No), the CPU 11 returns to the processing of the step T36 to request forcible reception of the time signal again.

On the other hand, if the flag data has been received (step T37; Yes), in a step T38, the CPU 11 determines whether the obtained flag data is reception NG flag data or not.

If the obtained flag data is the reception NG flag data (step T38; Yes), the CPU 11 controls the display section 13 to display a message informing that an accurate time signal has not been obtained and time correction has not been executed (step T39), and proceeds to subsequent processing, i.e., the processing of the step T1 of FIG. 8.

If the obtained flag data is the reception OK flag data (step T38; No), in the step T40, the CPU 11 outputs request information for requesting current date and time data to the electromagnetic wave clock unit 30 to the same, and makes this request to obtain the date and time data from the electromagnetic wave clock unit 30.

After the current date and time data has been obtained, in a step T41, the CPU 11 corrects time clocked by the clock circuit 18 based on the obtained current date and time data.

Next, in a step T42, the CPU 11 resets the counter value stored in the first counter value memory 141. Accordingly, the first counter value is set to 0, and increased again to the aforementioned fixed value. Then, processing executed by the CPU 11 proceeds to subsequent processing, i.e., the processing of the step T1 of FIG. 8.

Next, a case in which an ON state of the AC power source is determined in the step T1 of FIG. 8 will be described.

In a step T4, the CPU 1 determines whether the ECR 1 is in a standby state or not. Upon determination that the ECR 1 is in a standby state (step T4; Yes), in a step T5, the CPU 1 temporarily releases the standby state to start the ECR 1 (step T5), and proceeds to time correction processing executed in accordance with sensitivity in a step T6.

On the other hand, upon determination that the ECR 1 is not in a standby state (step T4; No), the CPU 1 proceeds to time correction processing executed in accordance with sensitivity in the step T6 without executing processing of the step T5.

Figure 10:
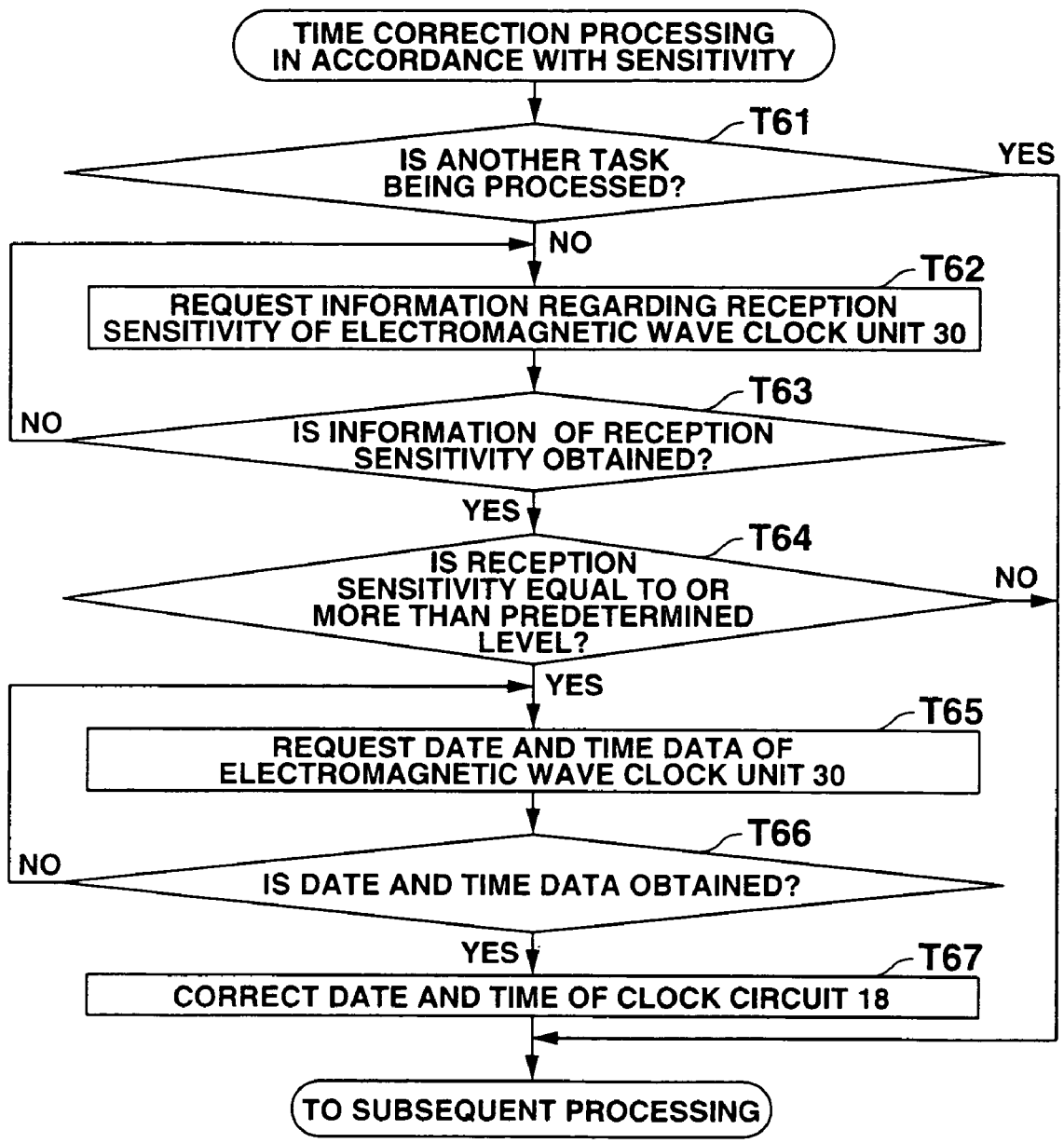
FIG. 10 is a flowchart explaining contents of time correction processing executed by the ECR shown in FIG. 1 in accordance with sensitivity.

Referring to FIG. 10, contents of the time correction processing executed in accordance with sensitivity in the step T6 will be described. This time correction processing in accordance with sensitivity is executed in a situation in which the ECR 1 is connected to the AC power source to be energized, i.e., the ECR 1 is being used. If reception sensitivity of the electromagnetic wave clock unit 30 is high at the time of starting the ECR 1, a time signal is received by the electromagnetic wave clock unit 30 to execute time correction.

In the time correction processing executed in accordance with sensitivity in FIG. 10, first in a step T61, the CPU 11 determines an operation situation of the ECR 1, and determines whether data processing of another task such as registration processing or settlement processing is being executed or not.

Upon determination that data processing of another task is being executed (step T61; Yes), the CPU 11 finishes the processing, and proceeds to subsequent processing, i.e., processing of a step T7 of FIG. 8.

On the other hand, upon determination that data processing of another task is not being executed (step T61; No), the CPU 11 generates request information for requesting information regarding the reception sensitivity of the electromagnetic wave clock unit 30, and outputs this request information to the electromagnetic wave clock unit 30 (step T62).

Next, in a step T63, the CU 11 determines whether information regarding the reception sensitivity of the electromagnetic wave clock unit 30 has been obtained or not. Upon determination that the information of the reception sensitivity has not been obtained (step T63; No), the CPU 11 returns to the processing of the step T62 to request the information of the reception sensitivity again.

Upon determination that the information of the reception sensitivity of the electromagnetic wave clock unit 30 has been obtained (step T63; Yes), the CPU 11 determines whether the reception sensitivity is equal to or more than a predetermined level, i.e., whether the reception sensitivity is good or not (step T64).

If the reception sensitivity is not equal to or more than the predetermined level (step T64; No), the CPU 11 finishes the processing without executing time correction, and proceeds to subsequent processing, i.e., processing of a step T7 of FIG. 8.

It is to be noted that if the reception sensitivity is not equal to or more than the predetermined level, the CPU 11 may control the display section 13 to display a message notifying that the reception sensitivity is low, and guide the user to change an electromagnetic wave reception position by rotating the rotary indicator P1.

On the other hand, if the reception sensitivity is equal to or more than the predetermined level (step T64; Yes), the CPU 11 generates request information for requesting current date and time data clocked by the electromagnetic wave clock unit 30, and outputs this request information to the electromagnetic wave clock unit 30 (step T65).

Next, in a step T66, the CPU 11 determines whether the date and time data has been obtained or not from the electromagnetic wave clock unit. If the date and time data has not been obtained (step T66; No), the CPU 11 returns to the processing of the step T65 to request the date and time data again.

If the date and time data has been obtained from the electromagnetic wave clock unit 30 (step T66; Yes), the CPU 11 corrects a date and time clocked by the clock circuit 18 based on the received date and time data (step T67). After the time correction, the CPU 11 finishes the process, and proceeds to subsequent processing, i.e., the step T7 of FIG. 8.

Description will be made by returning to the step T7 of FIG. 8.

In the step T7 shown in FIG. 8, the CPU 11 determines whether an operation mode of the ECR 1 has been set to an OFF mode or not by the mode key K2.

If the operation mode has not been set to the OFF mode (step T7; No), the CPU 11 returns to the processing of the step T1. If the operation mode has been set to the OFF mode (step T7; Yes), the CPU 11 executes time correction processing of a step T8 carried out at regular time intervals.

Figure 11:
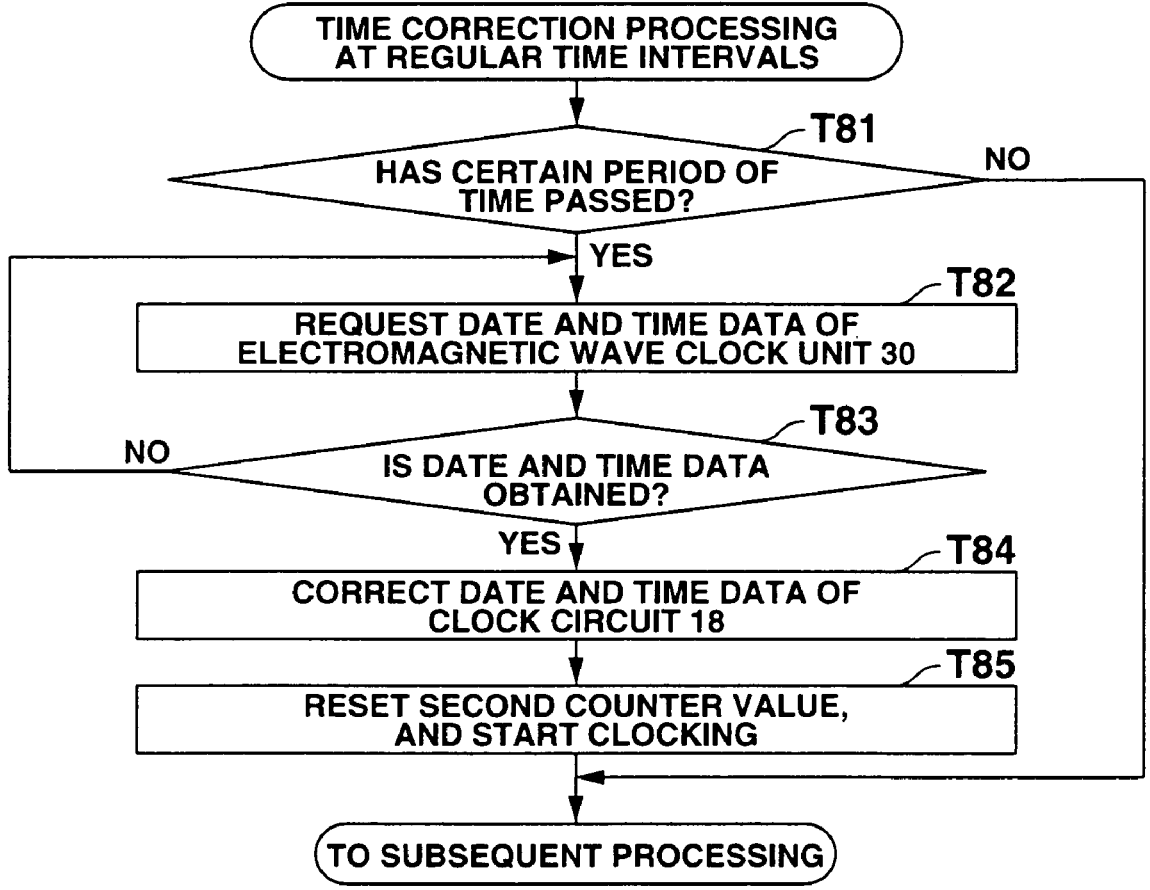
FIG. 11 is a flowchart explaining contents of time correction processing executed by the ECR shown in FIG. 1 at regular time intervals.

Referring to FIG. 11, contents of the time correction processing of the step T8 executed at regular time intervals will be described. This time correction processing at the regular time intervals is executed in a situation in which the ECR 1 is connected to the AC power source to be energized, i.e., the ECR 1 is being used. In the case of the OFF mode in which the operation of the ECR 1 is stopped, a time signal is received by the electromagnetic wave clock unit 30 to execute time correction.

In the time correction processing at the regular time intervals shown in FIG. 11, first in a step T81, the CPU 11 refers to a counter value stored in the second counter value memory 142 to determine whether this counter value has reached a fixed value or not, i.e., whether a fixed period of time has passed or not after resetting of a second counter value. Resetting conditions of the second counter will be described later.

Upon determination that the fixed period of time has not passed (step T81; No), the CPU 11 finishes the processing, and proceeds to subsequent processing, i.e., the step T1 of FIG. 8.

Upon determination that the fixed period of time has passed (step T81; yes), the CPU 11 generates request information for requesting current date and time data clocked by the electromagnetic wave clock unit 30, and outputs this request information to the electromagnetic wave clock unit 30 (step T82).

Next, in a step T83, the CPU 11 determines whether date and time data has been obtained or not from the electromagnetic wave clock unit 30. If the date and time data has not been obtained (step T83; No), the CPU 11 returns to the processing of the step T82 to request the date and time data again.

On the other hand, if the date and time data has been obtained from the electromagnetic wave clock unit 30 (step T83; Yes), the CPU 11 corrects the date and time clocked by the clock circuit 18 based on the obtained date and time data (step T84).

After the correction of the date and time, in a step T85, the CPU 11 resets the second counter value stored in the second counter value memory 142. Accordingly, the second counter value is set to 0, and incremented again to reach the aforementioned fixed value. The CPU 11 finishes the processing after the resetting of the second counter value, proceeds to subsequent processing, i.e., the processing of the step T1 of FIG. 8, and repeats time correction in accordance with an operation situation of the ECR 1.

Next, sales data processing executed by the ECR 1 in parallel with the aforementioned selection processing of the time correction method will be described by referring to FIG. 12. The sales data processing is for processing sales data in accordance with an operation mode designated by the mode key K2.

Figure 12:
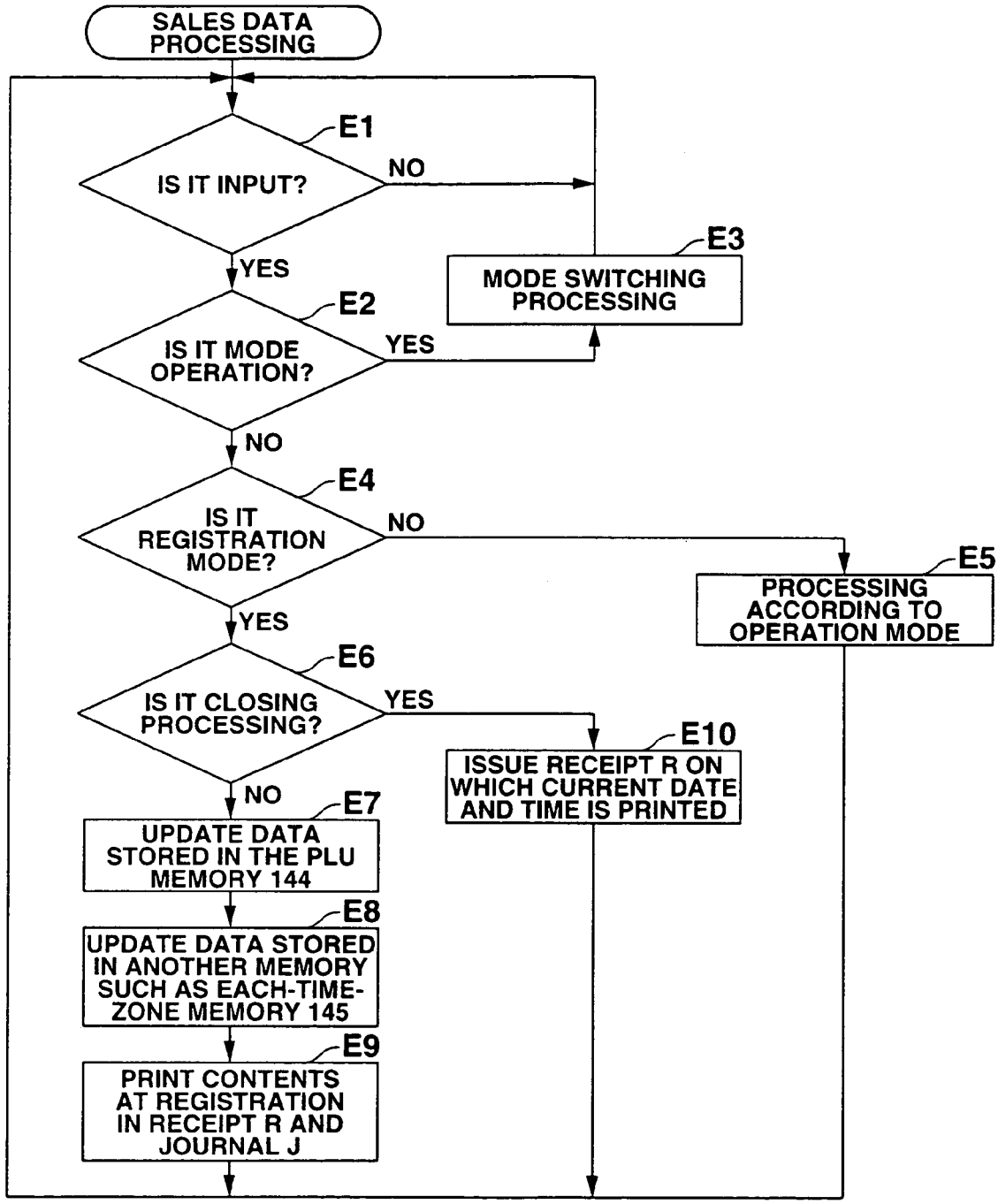
FIG. 12 is a flowchart explaining contents of sales data processing executed by the ECR shown in FIG. 1.

In the sales data processing shown in FIG. 12, first in a step E1, the CPU 11 determines whether there has been an input or not via the input section 12 from an operator.

If there has been no input (step E1; No), the CPU 1 waits for an input. On the other hand, if there has been an input (step E1; Yes), the CPU 11 analyzes the input to determine whether the input has been by the operation of the mode key K2 or not (step E2).

If the input has been by the operation of the mode key K2 (step E2; Yes), the CPU 11 executes operation mode switching in accordance with the operation input (step E3).

On the other hand, if the input has not been by the operation of the mode key K2, but by an operation of another key such as the ten key/function key K1 (step E2. No), the CPU 11 determines whether a current operation mode set by the operation of the mode key K2 is a registration mode or not (step E4).

If another mode such as an inspection mode or a setting mode has been set by the mode key K2 while the registration mode has not been set (step E4; No), the CPU 11 executes processing in accordance with the operation mode set by the mode key K2 (step E5).

On the other hand, if the registration mode has been set (step E4; Yes), the CPU 11 determines whether closing processing of registered sales data has been instructed or not by a key input (step E6).

If the closing processing has not been instructed, and if the input in the step E1 is sales data by the ten key/function key K1 (step E6; No), the CPU 11 registers the input sales data based on the date and time clocked by the clock circuit 18, and updates data stored in the PLU memory 144 (step E7).

Next, in a step E8, the CPU 11 updates data stored in another memory for data registration, such as an each-time-zone memory 145 based on the date and time clocked by the clock circuit 18.

After the updating of the information stored in each memory, in a step E9, the CPU 11 controls the printing unit 17 to print registered contents on a receipt R and in a journal J.

After the printing, the CPU 11 proceeds to the step E1 to repeat the processing of the steps E1 to E9 until registration closing processing is instructed, and registers the sales data.

If all the sales data have been registered and closing processing is instructed (step E6; Yes), the CPU 11 obtains current date and time data from the clock circuit 18, and controls the printing section 19 to print and issue a receipt R on which the current date and time has been printed, and to output this receipt through the paper ejecting part RM (step E10). After the end of the printing and issuing of the receipt R, processing executed by the CPU 11 returns to the step E1.

As described above, the ECR 1 selects the time correction method of correcting the date and time of the clock circuit 18 in accordance with the operation situation, and processes the sales data by using the date and time corrected by the selected time correction method. Thus, it is possible to omit the complicated work of manually correcting the time, and to process the sales data based on an accurate date and time.

The ECR 1 automatically selects an optimal time correction method in accordance with the operation situation. Thus, it is possible to execute time correction without affecting the sales data processing of the ECR 1.

While being shipped from the factory or transported to the user, the ECR 1 receives power not from the main power source, but from the secondary power source. In this case, the ECR 1 operates at regular intervals from the standby state, acquiring correct date-and-time data from the electromagnetic wave clock unit 30. On the basis of this data, the ECR 1 corrects the date-and-time data of the clock circuit 18. This makes it unnecessary to set the date and time at the factory or at the shop in which the ECR 1 has been installed.

The ECR 1 is temporarily started to execute the time correction, and then set again to a standby state. Thus, it is possible to execute the time correction by minimum power consumption.

The time correction is carried out while data processing is not executed. Thus, it is possible to execute the time correction without affecting the sales data processing.

For example, if the ECR 1 is energized to be started by the main power source after its installation at a store, the ECR 1 receives the time signal to correct the date and time when the reception sensitivity of the electromagnetic wave clock unit 30 is equal to or more than the predetermined level. Thus, the date and time can be corrected only when the reception sensitivity is high, thereby realizing high time correction processing efficiency.

If the ECR 1 is energized by the main power source but in an operation stopped state, the ECR 1 obtains the date and time data from the electromagnetic wave clock unit 30 at regular time intervals to correct the date and time of the clock circuit 18. Thus, for example, it is possible to automatically execute the time correction even at night or the like when the store is closed.

Especially, an electromagnetic wave reception state is good at night in most cases. Thus, the time correction can be executed at a time zone of a good reception state, thereby realizing high time correction efficiency.

The antenna 321 of the electromagnetic wave reception section 32 of the electromagnetic wave clock unit 30 is installed in the rotary indicator P1 to rotate its electromagnetic wave receiving direction associatively with rotation of the rotary indicator P1. Thus, the user rotates the rotary indicator P1, thereby changing its electromagnetic wave reception position. Thus, it is possible to improve reception sensitivity.

The configuration is employed in which the electromagnetic wave clock unit 30 comprises the aforementioned CPU 31 for controlling the clocking processing, the electromagnetic wave clock unit 30 can independently receive the time signal to execute the time correction, and the ECR 1 obtains the accurate date and time clocked by the electromagnetic wave clock unit 30 when necessary. Thus, it is possible to execute processing of another task such as sales data processing at the ECR 1 even during reception of the time signal.

The described contents of the embodiment are only preferred examples to which the present invention is applied, but not limitative of the invention.

For example, the embodiment has been described by way of example in which the present invention is applied to the ECR. Not limited to this, however, the present invention may be applied to an information processor such as a personal digital assistance (PDA), a portable telephone, or a computer for processing sales data.

The ECR 1 may set convenient time of a day such as closing of the store, and automatically receive a time signal to execute time correction at the set time every day. In this case, a mark or a message indicating that time correction is automatically executed at predetermined time may be displayed on the display section 13.

In the foregoing, the example of receiving the time signal containing the accurate date and time information through the standard electromagnetic wave has been described. However, a global positioning system (GS) signal containing accurate date and time information may be received from a GPS satellite.

In the foregoing description, the user manually rotates the rotary indicator P1 while checking the reception sensitivity displayed on the rotary indicator P1, thereby setting the reception sensitivity level in the high position. However, reception sensitivity may be automatically set in a maximum position by automatically rotating the rotary indicator P1 while detecting the reception sensitivity on the ECR 1 side.

Each of the ECR 1 and the electromagnetic wave clock unit 30 comprises the CPU, and the data processing efficiency by the CPU 11 of the ECR 1 side is increased. However, a CPU may be disposed only in the ECR 1, and reception control of a time signal of the electromagnetic wave clock unit 30 side, and time correction control may be executed only by this CPU.

Others, minute configurations and minute operations of the ECR 1 of the embodiment can be properly changed without departing from the spirit and scope of the present invention.

What is claimed is:

1. A sales data processing device which executes sales data processing by referring to a date and time, comprising:
    electromagnetic wave clock means for clocking a date and time, for receiving a time signal containing date and time information that is transmitted from a time signal transmission station, and for correcting the clocked date and time based on the received time signal;
    clock means for clocking a date and time for the sales data processing;
    processing state determination means for determining whether or not sales data processing is being executed;
    power source determination means for determining whether the sales data processing device is in an energized state in which power is supplied to the sales data processing device by a main power source, or in a standby state in which power is supplied to the sales data processing device by a secondary power source due to disconnection from the main power source; and
    selection means for, when the power source determination means determines that the sales data processing device is in the energized state to be operated by the main power source and when the processing state determination means determines that the sales data processing device is in a state of not executing the sales data processing, selecting a time correction method in which the time signal is received at regular time intervals by the electromagnetic wave clock means, and in which the date and time of the clock means is corrected by the correction means based on the time signal received at the regular time intervals.

2. The sales data processing device according to claim 1, further comprising display means for displaying information regarding a reception sensitivity of the time signal.

3. A computer-readable recording medium having a computer program stored thereon which is executable by a computer in a sales data processing device which executes sales data processing by referring to a date and time, wherein the sales data processing device comprises: (i) an electromagnetic wave clock section, which clocks a date and time, receives a time signal containing date and time information that is transmitted from a time signal transmission station, and corrects the clocked date and time based on the received time signal, and (ii) a clock section which clocks a date and time for the sales data processing, and wherein the program is executable by the computer to cause the computer perform functions comprising:
    determining whether or not sales data processing is being executed;
    determining whether the sales data processing device is in an energized state in which power is supplied to the sales data processing device by a main power source, or in a standby state in which power is supplied to the sales data processing device by a secondary power source due to disconnection from the main power source; and
    when it is determined that the sales data processing device is in the energized state to be operated by the main power source and when it is determined that the sales data processing device is in a state of not executing the sales data processing, selecting a time correction method in which the time signal is received at regular time intervals by the electromagnetic wave clock section, and in which the date and time of the clock section is corrected based on the time signal received at the regular time intervals.

* * * * *